Dec. 10, 1946.  S. T. JEFFREYS  2,412,339
CONTROL MECHANISM
Filed March 29, 1944  4 Sheets-Sheet 1
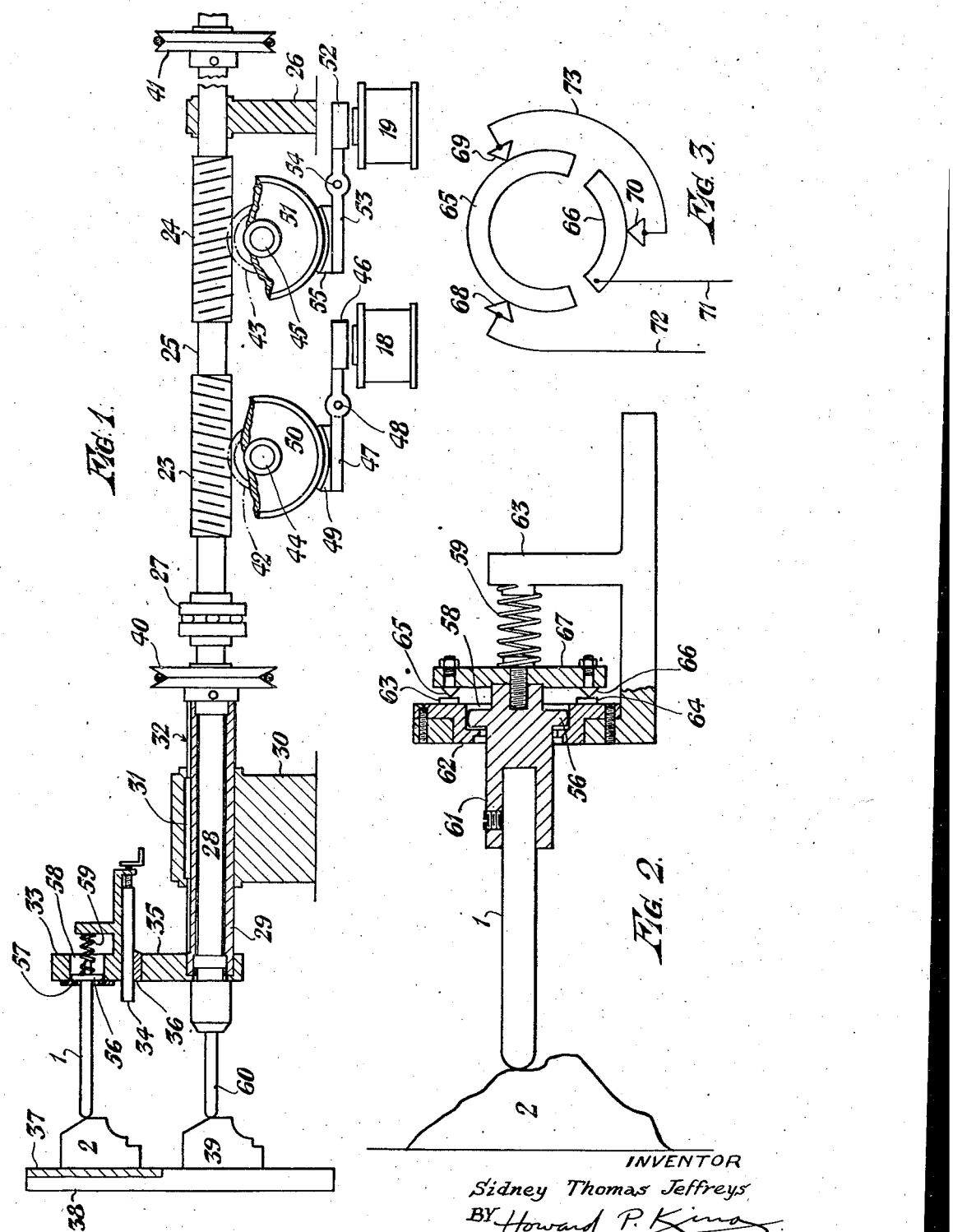
INVENTOR
Sidney Thomas Jeffreys
BY Howard P. King
ATTORNEY

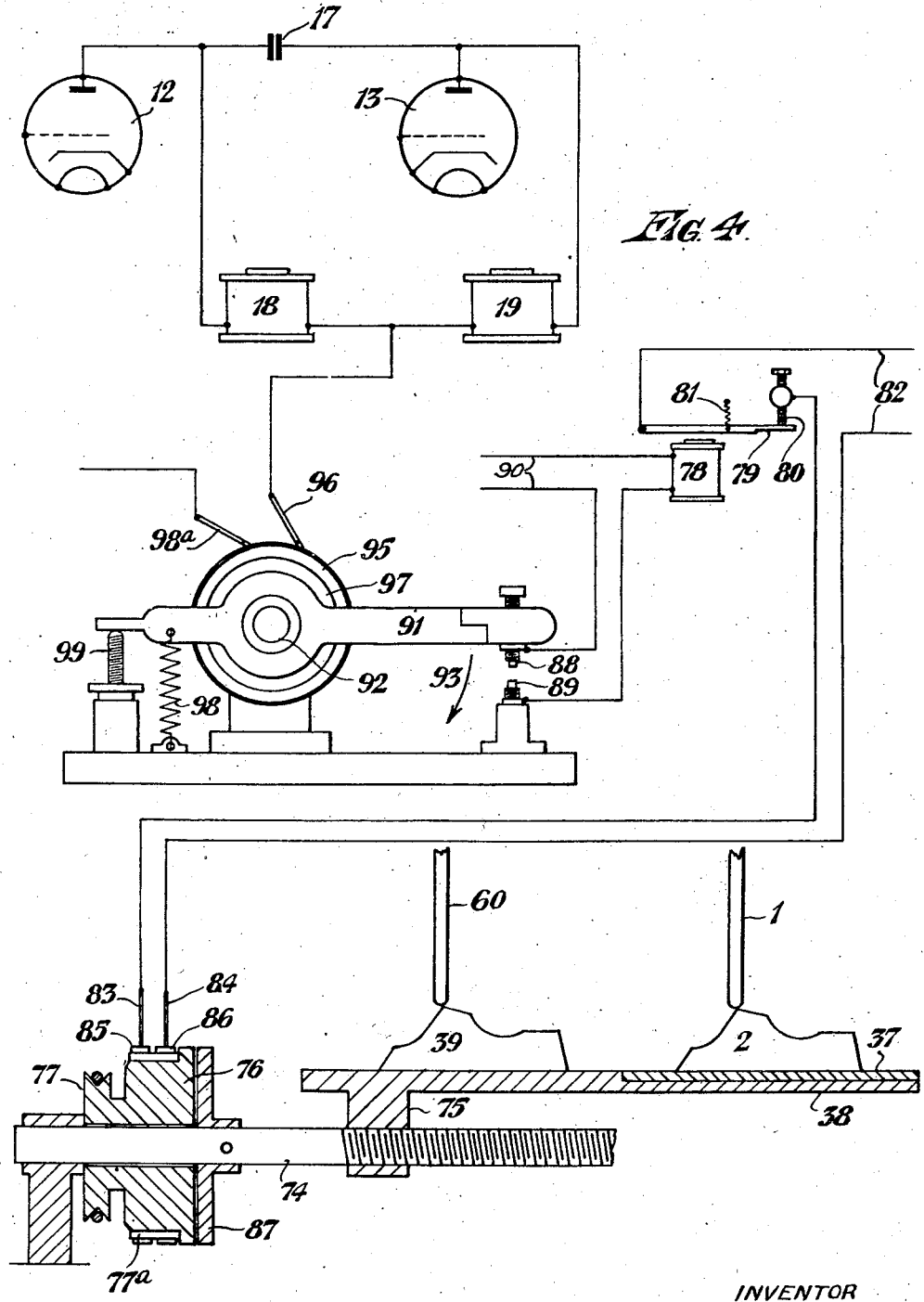

INVENTOR
Sidney Thomas Jeffreys
BY Howard P. King
ATTORNEY

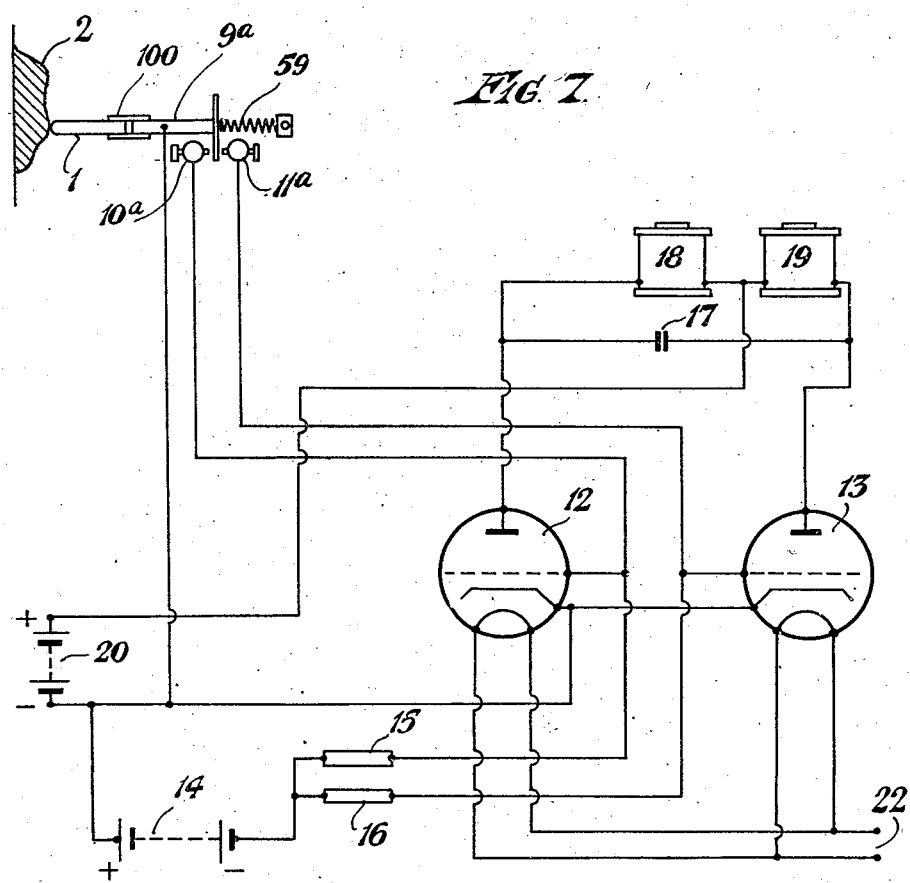

Patented Dec. 10, 1946

2,412,339

UNITED STATES PATENT OFFICE 2,412,339

CONTROL MECHANISM

Sidney Thomas Jeffreys, Rickmansworth, England, assignor to E. H. Jones (Machine Tools), Limited, London, England Application March 29, 1944, Serial No. 528,573
In Great Britain October 19, 1942

8 Claims. (Cl. 90—13.5)

This invention relates to automatic control means for machine tools.

An object of the invention is to provide a sensitive automatic control means for machine tools and the like, such for example, as copy milling machines, copy turning machines, and similar machines in which copies are reproduced from an original pattern or from templates, guide sheets or other outlines.

A further object of the invention is to provide automatic control means for the operation and the control of the movements of work tables and other slides and feeds customarily employed on machines.

Reference is now made to the accompanying drawings which illustrate by way of example a practical embodiment of the present invention:

Figure 1 illustrates as an example a simple means to effect the alternate feed and withdraw movements of the tracer and cutting tool of a copy milling machine, in accordance with the present invention;

Figure 2 is a sectional view of a tracer adapted to operate electrical contact points when moved against the pattern.

Figure 3 is a theoretical diagram of suitable electrical connections for contacts shown in Figure 2;

Figure 4 shows a suitable arrangement to effect stopping of a machine table traverse movement during a prolonged feed or withdraw movement of the tracer when working to a pattern;

Figure 7 illustrates theoretically an alternative electrical arrangement to that shown in Figure 5 for control of the tracer and cutting tool in which the first thermionic valve and the magnetic relay are not required.

Figure 5:
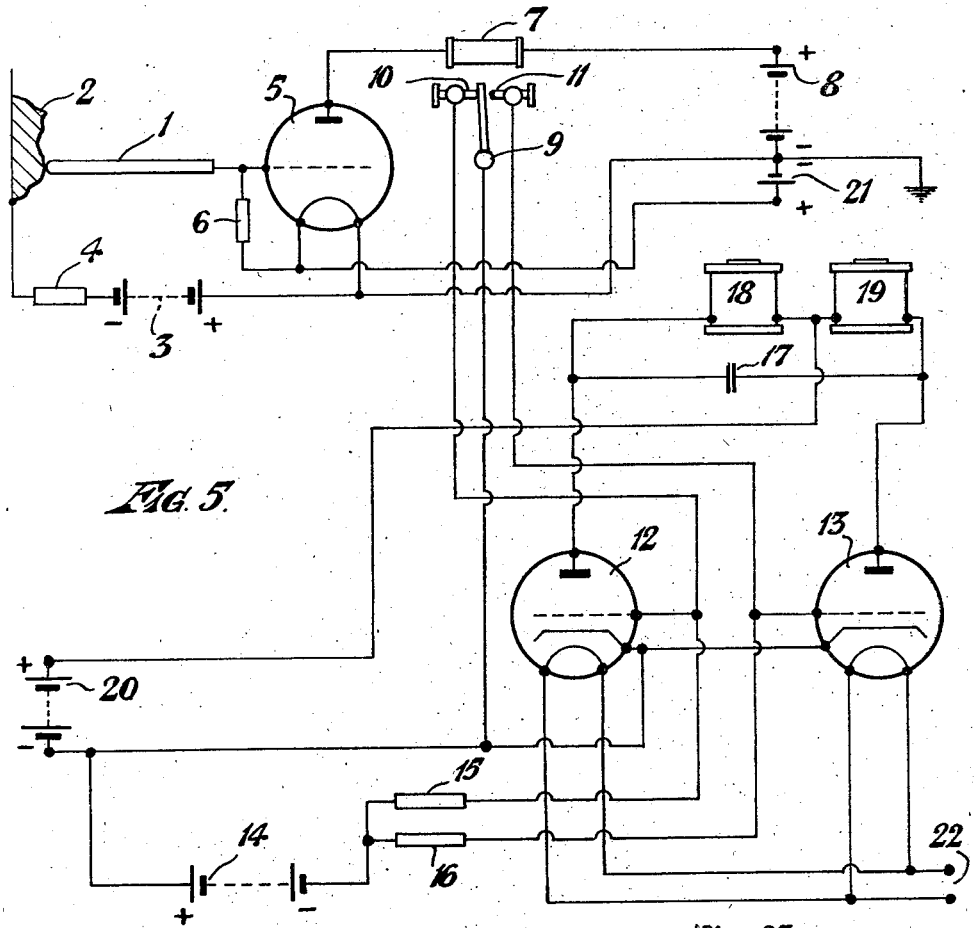
Figure 5 is a theoretical diagram of a suitable electrical control arrangement for the tracer and cutting tool.

Referring to Figure 1, two lead screws 23 and 24 of opposite hand screw threads form part of a spindle 25 mounted for rotary and longitudinal motion in the bearing 26. The spindle 25 is connected by coupling 27 to the cutter spindle 28, the said cutter spindle being mounted to rotate in the bearing sleeve 29 which is adapted for sliding motion in the bearing 30.

The bearing sleeve 29 is prevented from rotating in the bearing 30 by means of the key 31 which engages a key way in the bearing 30 and a keyway 32 in the sleeve 29.

The sleeve 29 is adapted to carry the tracer 1 by means of the holding device 33 which is slidably mounted to allow of adjustment upon the slide 34 which is mounted upon extension 35 of the sleeve 29 and arranged with suitable electrical insulation 36 to electrically isolate the tracer 1.

The pattern 2 is also electrically isolated by means of insulation 37 from the machine table 38 which carries the said pattern and the work 39 being reproduced by the cutter 60.

Rotation of the cutter 60 at a desired cutting speed independently of the speed of rotation of the lead screw spindle 25 is performed by separately driving the pulley 40 attached to the tool spindle 28 and the pulley 41 which is fitted upon the lead screw spindle 25, the coupling 27 allowing independent rotation of spindles 20 and 25 while preventing relative axial movement between them.

The idler wormwheels 42 and 43 fitted upon shafts 44 and 45 engage respectively the lead screws 23 and 24 so that rotary or longitudinal movement of the lead screw spindle 25 can cause rotation of the said idler wormwheels.

Operation of one or other of the electromagnets 18 and 19 can however prevent rotation of one or other of the idler wormwheels 42 and 43 so as to cause longitudinal movement of the rotary lead screw spindle 25 in one direction or the other.

In operation and when the electromagnet 18 is energised it pulls upon the armature 46 and the brake arm 47 which is pivoted at 48 forces the brake shoe 49 against the brake drum 50 which is fixed upon the idler wormwheel shaft 44 and so as to prevent or sufficiently retard rotation of the idler wormwheel 42.

This results in longitudinal movement of the lead screw spindle 25 and with it the cutter 60 in one direction or the other according to the direction of rotation of the said lead screw spindle and according to whether the lead screw 23 which engages the wormwheel 42 whose rotation is thus retarded is formed with a left or right hand screw thread.

Alternately, and when the electromagnet 19 is operated it stops or sufficiently retards rotation of the brake drum 51 by pull upon the armature 52 and the brake arm 53 pivoted at 54 which then causes pressure of the brake shoe 55 to be applied to the said brake drum 51 so as to stop or sufficiently retard rotation of the idler worm wheel 43 to which the brake drum 51 is attached by means of the shaft 45, thus causing longitudinal movement to the lead screw spindle 25 such movement, owing to the lead screw 24 being of opposite hand thread to that of the lead screw 23 will be in the opposite direction to that which occurs when electromagnet 18 is operated.

In operation, the tracer 1 is fixed or if desired held firmly in position with an enlarged portion 56 pressed against a seating 57 and within a cavity 58 of the carrier 33 by the tension of a spring 59, the said enlarged portion 56 of the tracer being suitably shaped to allow of its being swivelled or moved backward within the cavity 58 against pressure of the spring 59 should the tracer meet with undue end or added pressure during working.

Also if desired, this arrangement can be modified so that the said movement will operate electrical contacts and effect the stopping of the machine and/or the automatic withdrawing of the tracer from the pattern and the cutter from the work in case of undue pressure of the tracer against the pattern such as might be caused by a breakdown or development of a fault in the control system.

Figure 2 is a sectional view of a suitable arrangement whereby instead of effecting control of copy milling machine movements by the alternate making and breaking of electrical contact between the tracer and pattern movement of the tracer is adapted to control the opening and closing of electrical contact points when it is moved against and away from the pattern, such contact points being adapted to control the grid circuit of a thermionic valve as hereinafter described to effect automatic feed and withdraw movements of the tracer and cutting tool.

In Figure 2 the tracer 1 is fitted in a holder 61, the enlarged end 56 being located within cavity 58 of the carrier 62 which is of electrically insulating material and to which are fitted electrical contact plates such as 63 and 64.

Fitted to the rear end of the holder 61 is a disc or the like 67 of electrically insulating material which carried contact points, preferably three in number, and such as 65 and 66, the said contact points being normally kept pressed against the contact plates 63 and 64 by tension of the spring 59. It will be seen that direct or side pressure on the tracer will cause one or more suitably positioned contact points to be lifted from the contact plates and when the tracer is freed from the pattern the electrical contacts are remade. The desired feed and withdraw movements of the tracer towards and from the pattern can be conveniently and automatically effected by adapting the make and break of such electrical contacts to suitably control the control grid of a thermionic valve and other means as hereinbefore described.

Figure 3 illustrates theoretically one form of electrical circuit suitable for use with such a tracer in which when the tracer is free of the pattern the contact points 68, 69 and 70 are in electrical contact with the contact plates 65 and 66 thus completing the electrical circuit in the control grid of a valve via lead 72, contact 68, contact plate 65, contact 69, lead 73, contact 70, contact plate 66 and lead 71.

Figure 4 illustrates for example one suitable means for automatically effecting stopping of the traverse movement of the work table of a copy milling machine during operation and during a prolonged feed or withdraw movement of the tracer, so that, if owing to a particular outline or shape of that part of the pattern being copied the tracer does not make contact or alternatively does not break contact with the pattern within a prearranged time or distance of traverse of the work table the said stopping of the said traverse if effected, this being again automatically restarted at the next following reversal movement of the tracer towards or from the pattern.

In Figure 4 the work table 38 which carries the work 39 and the pattern 2 upon the electrical insulation 37 is adapted for traverse movement by means of rotation of the lead screw 74 which engages a nut member 75 attached to the said work table. An electro-magnetic clutch 76 which is rotatably mounted upon an extension of the lead screw shaft 74 is driven by suitable means such as a pulley 77 forming part of the said clutch.

In operation and when the relay winding 78 is not energised, the armature 79 is electrically released and is pulled back by means of the spring 81 so that the contacts 79 and 80 close and complete the electrical circuit from the source of electrical supply 82 through the winding of the clutch 76 via the contact brushes 83 and 84 and slip rings 85 and 86 which are mounted upon the insulating ring 77a fixed upon the clutch body.

The rotating clutch 76 thus becomes energised and rotates the lead screw shaft 74 by gripping the clutch plate 87 which is fixed upon the said lead screw shaft. When the coil 78 of the relay is operated the relay contacts 79 and 80 open and release the clutch 76 which then becomes free to rotate without effecting rotation of the clutch plate 87 and the lead screw shaft 74 so that traverse movement of the work table 38 ceases.

The on and off operation of the relay coil 78 to effect alternate operation and release of the clutch 76 is effected by the closing and opening of the contacts 88 and 89 by means of which the electrical circuit from the source of supply 90 can be opened or closed.

This is effected automatically by movement of the contact arm 91 about the axis of the bearing shaft 92. When sufficient movement of the said contact arm takes place in the direction of the arrow 93 the contact 88 suitably insulated and carried by the contact arm 91 makes electrical contact with the fixed contact 89, this movement being caused when the magnetic clutch 95 which is rotated constantly in the direction of the arrow 93 upon the bearing shaft 92 is energised so as to grip and rotate with it a clutch plate 97 which is also rotatably mounted upon the bearing shaft 92 and which carries the contact arm 91.

Operation of either of the electromagnets 18 and 19 as hereinbefore described, and which effect the feed and reversing movements of the tracer towards and from the pattern, also operates the clutch 95 and commences movement of the contact arm 91 in the direction of the arrow 93.

Should a reversal of a particular feed or withdraw movement of the tracer not take place within a prearranged time or distance of traverse of the work table the contacts 88 and 89 will close and operate the relay coil 78 which then opens the contacts 79 and 80 so as to cause traverse movement of the work table to stop.

When the next reversal of the movement of the tracer takes place as the tracer touches or breaks contact with the pattern, the clutch 95 momentarily releases the clutch plate 97 so that the contact arm 91 is reset with the contacts 88 and 89 open by means of the spring 98 which pulls the opposite end of the contact arm 91 against the stop 99 so that the clutch 76 again becomes energised and the traverse movement of the work table restarted as before described.

12 and 13 are gas filled relays which operate the electromagnets 18 and 19, the electrical circuits via the electromagnets 18 and 19 being completed through contact brushes 96 and 98a and the winding of the clutch 95 to the source of suitable electrical supply.

Figure 5 is a theoretical diagram of a suitable electrical control arrangement for the tracer and cutting tool.

In Figure 5 the the tracer 1 of a copy milling machine is shown in contact with a pattern 2 thus completing the electrical circuit from the negative of the grid bias electrical supply 3 via a current limiting resistance 4 to the control grid of the thermionic valve 5 which is preferably provided with a grid leak 6.

The operating winding 7 of the magnetic relay is shown connected in the anode circuit of valve 5 and source of anode supply 8.

The moving armature 9 of the magnetic relay is swung by magnetic influence of winding 7 and makes electrical contact alternately with the fixed contacts 10 and 11 which are connected to the control grids of the gas-filled relays 12 and 13 respectively and to the negative of a grid bias supply 14 via the resistances 15 and 16.

It will be seen that when the moving armature 9 makes alternate electrical contact with the fixed contacts 10 and 11 the negative bias applied to the control grids of the gas-filled relays 12 and 13 by the grid bias supply 14 is removed from each control grid in turn and sufficient negative bias is thus removed to allow the anode emission to start in each case, such operation of each gas-filled relay automatically extinguishing the anode emission of the other by the effect of the automatic discharge of the electrical condenser 17, the control grid of the said other gas-filled relay having again a suitable negative bias owing to the opening of its grid control contacts 9 and 10 or 9 and 11 of the magnetic relay.

The electromagnets 18 and 19 which are shown connected directly in the anode circuits of the gas-filled relays 12 and 13 are thus alternately energised and released and for the purpose of the present invention this alternate action of the feed and withdraw movements is equally applicable as means to effect control of an electrical tracer and cutting tool of a copy milling machine in relation to a pattern being copied, and/or to effect control of forward and reverse movements of a sliding machine table or other component.

The circuit as shown in Figure 5 is adapted for operation of the electromagnets 18 and 19 by means of direct current, the source of supply being indicated by the battery 20.

21 and 22 indicate separate sources of electrical supply for heating the filaments of the valve 5 and gas-filled relays 12 and 13 but the circuit can conveniently be modified for all filaments to be heated from a single electrical source.

Figure 6:
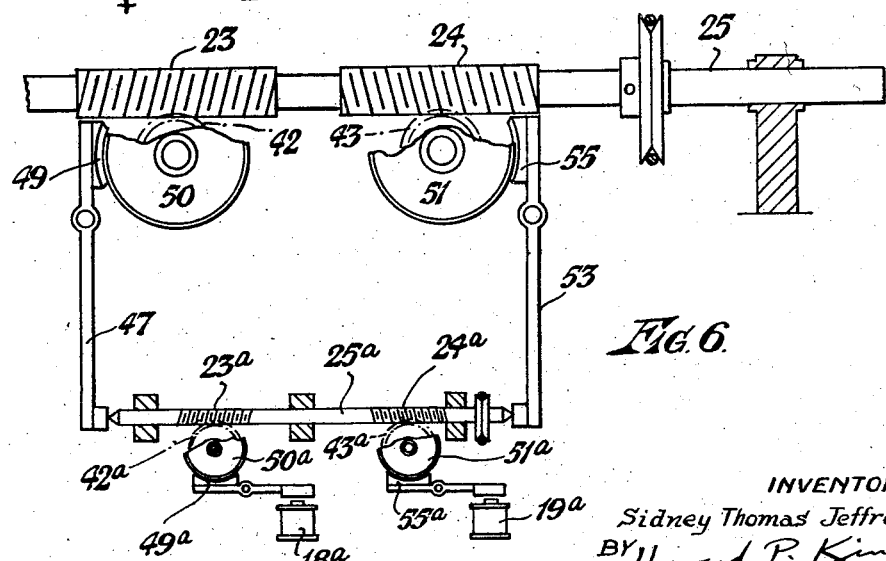
Figure 6 shows an alternative method of obtaining the reversal of the tool.

In Figure 6 is shown an alternative method of applying a brake to the drums 50 and 51. The brakes as indicated by 49 and 55 are operated alternately by reversing axial movements of an auxiliary lead screw shaft 25A which in operation moves alternately against the brake arms 47 and 53, the said axial movements of the auxiliary lead screw shaft being effected substantially in the manner hereinbefore described for the operation of the cutter lead screw shaft, the said auxiliary lead screw shaft having left and right hand screw threads 23a and 24a engaging idler worm-wheels 42a and 43a which carry brake drums 50a and 51a upon their bearing shafts, rotation of the idler wormwheels being retarded alternately by alternate operation of the electromagnets 18a and 19a which thus causes the alternate operation of the brakes 49a and 55a.

The operation and the control of the two electromagnets 18a and 19a is effected by the making and breaking of electrical contact of the tracer and the pattern, the said electromagnets being connected in the anode circuits of the gas filled relays as hereinbefore described.

An object of the use of such auxiliary lead screw shaft to effect operation and control of the brakes is to effect an increase in the rapidity of the reversing action of the cutter lead screw shaft such as might be desired in the case of a large copy milling machine for example, and in which time lag in the response of relatively large electromagnets operating directly upon the brakes and idler wormwheels would have a dilatory effect upon the reversing movements of the cutter lead screw spindle.

By means of operation with an auxiliary lead screw shaft as described sufficient power is available in the axial movements of such auxiliary lead screw shaft to operate the brakes while using relatively small electromagnets, such small electromagnets, of course, having a higher speed of response than the larger ones which would be required if the breaking was arranged to operate directly upon the cutter lead screw shaft control brakes. Further to the present invention and the foregoing other modifications are possible and obvious, such as the use of a plurality of cutting tools operating in unison with the tracer and reproducing a plurality of copies while controlled by a single tracer and pattern.

In Figure 7 is shown for example, one suitable modification of the electrical control circuit illustrated in Figure 5.

According to Figure 5 the moving contact 9 and the fixed contacts 10 and 11 are described as being operated by the coil 7 of an electromagnetic relay, while in Figure 7 these contacts 9, 10 and 11 are represented respectively by the contacts 9a, 10a and 11a. It will be seen that in the modified circuit shown in Figure 7 the first thermionic valve and the electromagnetic relay are not used, and that the said contacts are adapted for direct mechanical operation. In Figure 7 the tracer 1 is preferably electrically insulated from the contact plate as indicated by the insulating coupling 100, the contacts 10a and 11a being suitably mounted upon and electrically insulated from the tracer housing or carrier. In operation and with the tracer clear of the pattern, contact 9a is pressed into engagement with contact 10a by means of the spring 59 so that the gas filled relay 12 and the control magnet 18 operate and cause movement of the tracer towards the pattern. At the same time, contact plate 9a is clear of the contact 11a so that negative grid bias prevents the operation of the gas filled relay 13 and the control magnet 19. When the tracer moves against the pattern, continued movement of the tracer housing and the contacts 10a and 11a relative to the tracer and contact plate 9a is caused and the contact of 9a with 10a is broken so that the negative grid bias becomes reapplied to the gas filled relay 12 which however continues to operate until contact 9a makes electrical contact with 11a and by thus removing the grid bias of the gas filled relay 13 causes this and the control magnet to operate and to first effect a reversal movement of the tracer housing and the contacts 10a and 11a and then the tracer which then commences to move from the pattern, discharge of the condenser 17 automatically extinguishing the anode current emission of the gas filled relay 12 at the instant at which the gas filled relay 13 operates. When the gas filled relay 13 thus operates and the reversal movement from the pattern takes place the tracer housing and the contacts 10a and 11a first move relative to the contact 9a the tracer remaining in contact with the pattern under pressure of the spring 59 until the contact 10a which is moving outwards from the pattern engages the contact plate 9a and so causes the said tracer to be moved from the pattern. During this outward reversal movement contact 9a breaks contact with 11a so that the negative grid bias is reapplied to the gas filled relay 13 which continues to operate until 10a engages 9a when the gas filled relay 12 is again caused to operate and the operation of the gas filled relay 13 automatically stopped by discharge of the condenser 17.

This results in a short vibratory movement of the tracer which is thus maintained more or less in contact with the pattern, and a continuous reversing movement of the tracer carrier and the contacts 10a and 11a, the said contacts alternately making electrical contact with the contact 9a.

Also in this and other modifications the said electrical contacts can be modified if desired to suit the requirements and purposes of a tracer having a wobble or other movement when contacting the pattern, such as for example, a tracer as illustrated in Figure 2 which can be conveniently adapted with suitably connected contacts if desired to suit the requirements of the modification referred to in Figure 7.

What I claim is:

1. A copy milling machine comprising two lead screws adapted for rotary and longitudinal motion and constructed and arranged to each have the same motion as the other simultaneously, two idler worm wheels each of which engages one of the lead screws, a milling tool mounted to respond to the longitudinal movements of the lead screws, braking means for said worm wheels, and a tracer engageable with a pattern and having controlling connection to said braking means.

2. A copy milling machine as claimed in claim 1 wherein the two lead screws form part of a single spindle and wherein the milling tool is mounted axially with respect to the said spindle and is free to be rotated at any desired cutting speed.

3. A copy milling machine as claimed in claim 1 wherein the lead screws are controlled by electromagnetically operated brakes the operation of the said brakes being controlled by movement of the tracer into and out of contact with the pattern being copied to operate electrical contacts which make and/or break electrical circuits controlling the electromagnets to produce a reverse movement to the tracer to again contact or break contact with the pattern and to produce a corresponding movement of the cutting tool.

4. A copy milling machine as claimed in claim 1 wherein the tracer is mounted in fixed relationship with the spindle carrying the lead screws and the cutting tool.

5. A copy milling machine as claimed in claim 1 wherein pressure of the tracer against the pattern is adapted to break an electrical circuit to operate the appropriate electromagnet to effect withdrawal of the tracer and cutting tool and vice versa.

6. A copy milling machine as claimed in claim 1 wherein contact of the tracer with the pattern completes an electrical circuit through the pattern to effect an appropriate withdrawal movement of the tracer and cutting tool and vice versa.

7. Means for controlling movement of a machine tool element comprising two lead screws adapted for rotary and longitudinal motion and constructed and arranged to each have the same motion as the other simultaneously, two idler worm wheels each of which engages one of the said lead screws, and means for increasing or decreasing the speed of rotation of one or both idler worm wheels with respect to the speed of rotation of the respective lead screw to cause a differential rotation between said worm wheels and consequential longitudinal movement of said lead screws, the last mentioned said means comprising an electrically controlled device and a thermionic valve having a grid connected with and controlling said device by varying the electrical potential applied to said grid.

8. Means for controlling movement of a machine tool element comprising two lead screws adapted for rotary and longitudinal motion and constructed and arranged to each have the same motion as the other simultaneously, two idler worm wheels each of which engages one of the said lead screws, and means for increasing or decreasing the speed of rotation of one or both idler worm wheels with respect to the speed of rotation of the respective lead screw to cause a differential rotation between said worm wheels and consequential longitudinal movement of said lead screws, the last mentioned said means comprising electromagnets for affecting movement of the screws and two thermionic valves preferably of the gas filled relay type having anodes and anode circuits, said electromagnets being connected in said anode circuits and said valves being operated alternately so when one is operated its anode current operates one of the electromagnets and when the other is operated the other electromagnet is operated, the operation of either of the said gas filled relays being adapted to cause the anode current of the other to be extinguished and the electromagnet which it controls to be thus released.

SIDNEY THOMAS JEFFREYS.